Figure 1:
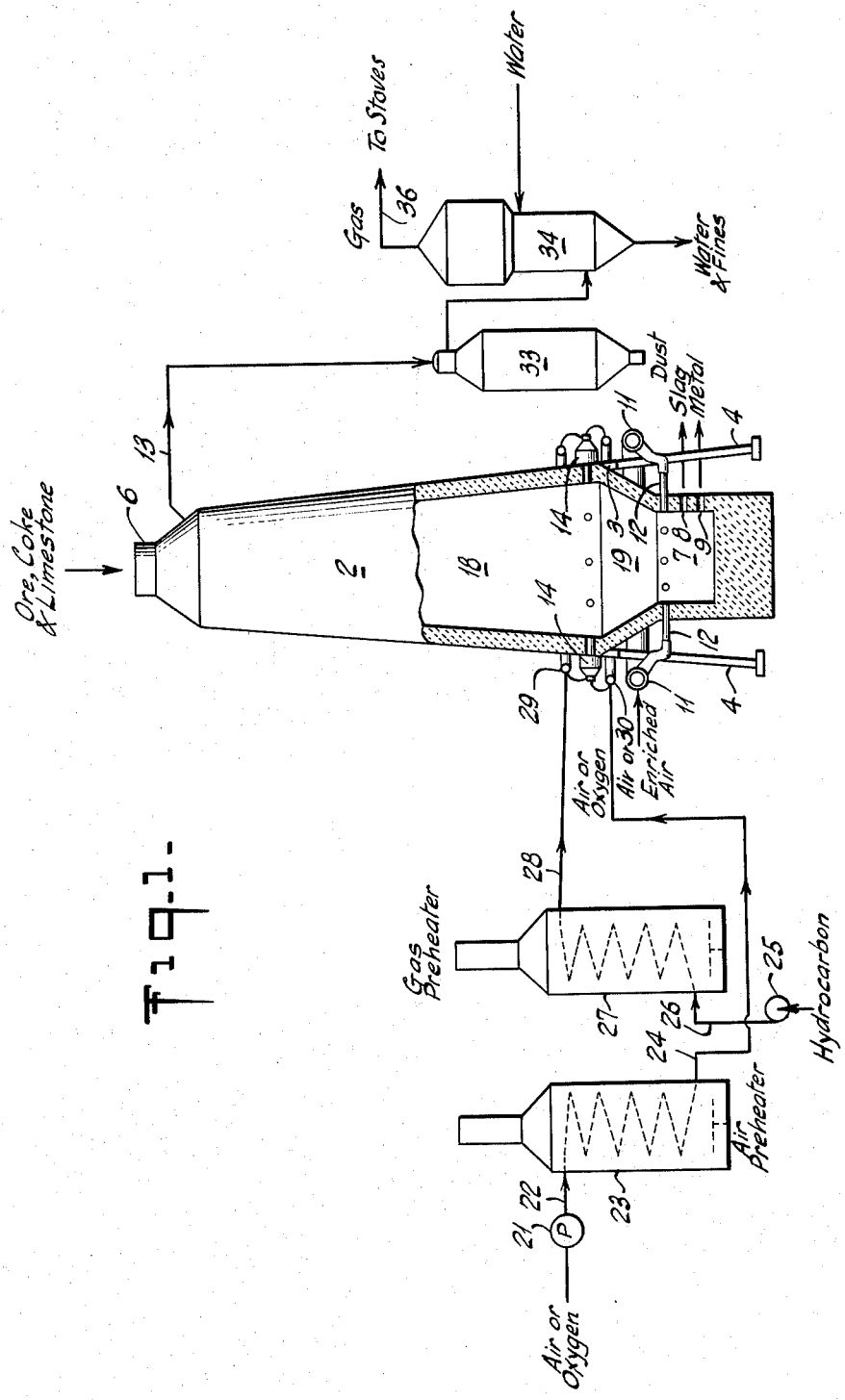

Oct. 26, 1965   T. H. WHALEY   3,214,266
BLAST FURNACE REDUCTION OF METAL OXIDES
Filed June 28, 1962   2 Sheets-Sheet 1

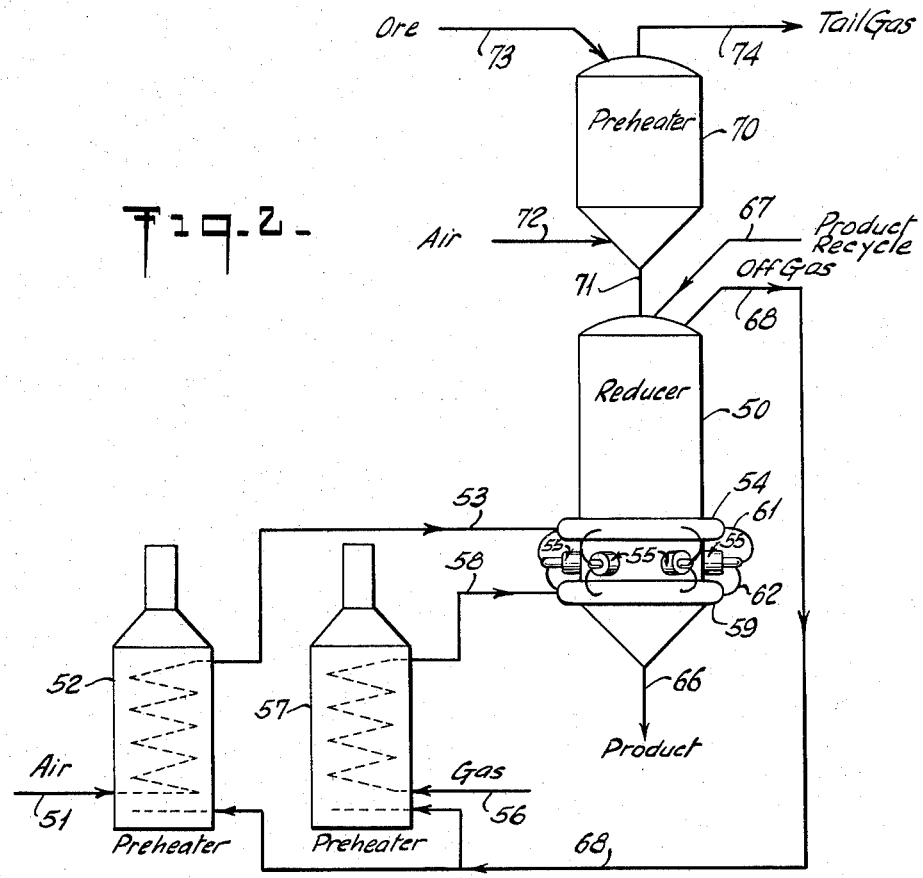
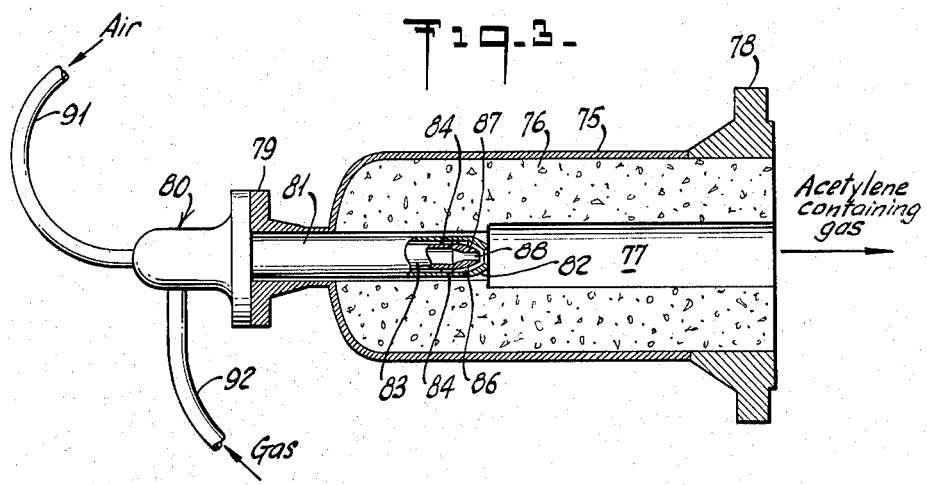

United States Patent Office 3,214,266
Patented Oct. 26, 1965

3,214,266
BLAST FURNACE REDUCTION OF METAL OXIDES
Thomas H. Whaley, Mount Vernon, N.Y., assignor to Texaco Development Corporation, New York, N.Y., a corporation of Delaware
Filed June 28, 1962, Ser. No. 206,063
5 Claims. (Cl. 75—42)

This invention relates to a process for the reduction of metal oxides. In one of its more specific aspects, this invention relates to a process for reduction of metal oxide with a reducing gas comprising carbon monoxide, hydrogen and acetylene. In another of its more specific aspects, this invention relates to a process for the production of metallic iron by reduction of iron oxide, particularly iron ore, in a blast furnace supplemented by separately generated reducing gas comprising carbon monoxide, hydrogen and acetylene.

In accordance with this invention, a reducible metal oxide is contacted with a reducing gas mixture of carbon monoxide, hydrogen and acetylene. The reduction of the solid metal oxide to elemental metal preferably is carried out in a shaft or bed type reduction furnace in which a large mass or bed of the metal oxide is maintained. Fluid beds, downwardly moving settled beds, or fixed beds in which reduction is carried out batch-wise, may be employed, if desired. In the preferred moving bed process, metal oxide is charged to the top of the bed and reduced metal is drawn from the bottom of the bed so that the operation is continuous. The reducing gas is introduced near the bottom of the bed and passed upwardly through the bed countercurrent to the movement of solid particles.

For the direct reduction of ore with reducing gases, the acetylene-containing reducing gas of the present invention is employed in place of conventional reducing gases. One important advantage of the present invention is that the ore reduction is less endothermic than with hydrogen or carbon monoxide so that less external heating of the ore and reducing gas are required. Furthermore, acetylene-containing gas derived by direct partial oxidation of hydrocarbons has a higher reducing potential than conventional reducing gases from the same source so that a more efficient process results.

The process of this invention is applicable to and particularly useful for blast furnace operations in which externally generated reducing gas is introduced into a furnace to supplement the reducing gas produced therein. By employing the process of this invention, part or all of the coke required for conventional blast furnace operations may be eliminated.

In the production of pig iron in a conventional blast furnace, coke and limestone are added to the top of the blast furnace with the ore. Air or oxygen-enriched air is introduced in the base of the furnace to consume the coke and generate carbon monoxide, which, in turn, reduces the ore. In accordance with the present invention, at least a portion of the reducing gas required for the reduction of ore in the furnace is generated in a series of acetylene generators and introduced directly into the ore stack. The acetylene-containing gas is introduced at points sufficiently removed from the tuyeres through which the air blast enters the furnace as to prevent reaction between the acetylene-containing reducing gas and the air or oxygen. The acetylene-containing reducing gas may enter the blast furnace at a series of points intermediate the blast tuyeres or above the level of the tuyeres and within the reducing portion of the furnace, preferably in the lower one third of the blast furnace.

It has been proposed heretofore to supplement the reducing gas in a blast furnace by the introduction of various gases, including coke oven gas, methane, carbon monoxide, and mixtures of carbon monoxide and hydrogen generated externally of the blast furnace. It has also been proposed to generate reducing gas from hydrocarbons by reaction with air within the blast furnace itself. In some of these processes, natural gas or oil is injected directly into the blast furnace, often through the tuyeres through which the blast air is introduced. In such cases, supplemental reducing gas is generated within the blast furnace itself by cracking of the gas or oil in the presence of hot coke and ore contained in the blast furnace shaft. Because of the high heat load imposed on the furnace by such procedures, their application is limited.

The generation of reducing gas in a separate reaction zone followed by its introduction into the ore reducing furnace, is a highly effective method for supplementing the reducing gas atmosphere of a blast furnace with an auxiliary reducing gas adapted for and specifically tailored to the requirements of the particular furnace. Large gas generators are needed in prior art processes to provide the reaction time of 2 to 10 seconds required to produce a suitable reducing gas by direct partial oxidation of hydrocarbons.

The present invention provides a means for generating a highly satisfactory reducing gas containing 1 to 4 mol percent acetylene by reacting a hydrocarbon with air in compact reactors with short reaction times of the order of 0.01 second.

Hydrocarbons, e.g. methane, ethane, propane, butane, natural gas, mixtures of hydrogen and gaseous hydrocarbons, or other gases rich in light hydrocarbons, are suitable for use in the present process. Air, oxygen-enriched air, or relatively pure oxygen may be used. Oxygen, e.g., relatively pure oxygen obtained by liquefaction and rectification of air, is advantageous, but generally air or oxygen-enriched air is more economical. When applied to blast furnace operations, oxygen may be supplied to the blast tuyeres also to supplement the blast furnace air. The use of oxygen in blast furnace operations is advantageous in that the gas leaving the furnace has a reduced nitrogen content and a higher heating value than when air alone is used, making the gas suitable for use as fuel gas or town gas. At the same time the throughput, or productive capacity, of the blast furnaces may be considerably increased as compared with a conventional blast furnace operation.

The hydrocarbon and air, oxygen, or oxygen-enriched air are supplied to an unpacked reaction zone in which the residence time, as calculated from the volume of the reaction products, is in the range of about 0.005 to about 0.05 second and preferably about 0.01 second. The temperature in the reaction zone is maintained at an autogenous temperature above 2000° F., preferably in the range of 2000° F. to 3500° F. Suitably the reaction zone is maintained at about 2100° F. to 2200° F. when the oxygen-containing gas is air. With oxygen, the temperature maintained in the reaction zone is generally higher, suitably 2800–3000° F. The proportions of the hydrocarbon and oxygen are adjusted to give the highest yield of acetylene from a given feed gas and may be determined by trial. In the specific example which appears herein, the ratio of oxygen to carbon, calculated as gram atoms of oxygen and gram atoms of carbon, is about 1.3. The acetylene-containing gas stream from the gas generation zone is passed directly into the ore reduction furnace. A cylindrical reaction chamber having a length of about 18 inches has been found satisfactory for generating acetylene-containing reducing gas.

The gas generation is carried out at a pressure only slightly higher than the pressure of the ore reduction operation, usually within the range of 15 to 90 pounds per square inch absolute. The pressure within the gas generator is preferably sufficiently higher than the pressure in the blast furnace to produce a high velocity in the tuyere through which the gases enter the ore stack.

When using natural gas for the generation of the reducing gas, it should be heated to a temperature of 600° F. or higher before it is introduced to the acetylene generator. Air should be heated to a temperature above 1500° F. prior to entering the acetylene generator.

The acetylene contained in the reducing gas is a very active reducing agent, liberating heat upon reaction with oxygen from the ore and offsetting to a large extent the endothermic reactions simultaneously taking place in the reduction zone. A small amount of carbon is contained in the reducing gas, which is in very active, finely divided form and which is readily available for direct reduction of the ore in the reduction zone.

As applied to a blast furnace, the acetylene generators are deployed about the base of the blast furnace preferably in the lower third of the stack section where the temperature of the stock, i.e. iron ore, coke, and limestone, is above 1600° F. The burners are spaced from the blast tuyeres a sufficient distance, for example, 3 feet, to substantially preclude reaction between the hot oxygen-containing blast and the hot reducing gases introduced from the acetylene burners. The burners may be placed either above the line of the blast tuyeres or may be positioned intermediate and on the level with the tuyeres. The acetylene-containing gases penetrate the ore stock and ascend countercurrent to the descending bed of stock or solid charge material where they supplement the reducing action of the gases generated in the lower bed or bosh section of the blast furnace.

The blast furnace is charged in the usual manner with coke, iron ore and limestone, but with less than the usual amount of coke relative to the quantity of ore charged. Air or oxygen-enriched air is supplied to the blast furnace through the tuyeres in the usual manner. The net result is an increase in blast furnace production. Alternatively, the amount of air blast to the tuyeres may be diminished to permit the gas velocity through the stack to remain constant with the capacity of the blast furnace remaining substantially the same but with a reduction in the amount of coke required per ton of pig iron produced by the furnace.

As pointed out above, all of the reducing gas may be produced by the acetylene generators thus completely or substantially completely eliminating the coke requirements for the ore reduction furnace. In the latter case, it is sometimes desirable to supply pure oxygen to the acetylene generators and to recycle off gases from the ore reducer. The recycled gas may be reformed by reaction with additional hydrocarbon gas, suitably over an iron catalyst. Electrical heating may be used to supplement the heat from the gas generators and ensure fusion in the ore reducer.

The process and apparatus of this invention will be more readily understood from the following detailed description with reference to the accompanying drawing illustrating specifically the invention as applied to blast furnace operations.

FIG. 1 illustrates diagrammatically a preferred embodiment of the invention as applied to the production of pig iron from iron ore in a blast furnace. FIG. 2 illustrates diagrammatically the direct reduction of ore by the process of this invention. FIG. 3 is a cross-sectional view of apparatus suitable for the production of acetylene-containing gas for use in the process.

With reference to FIG. 1 of the drawings, the numeral 2 designates a blast furnace of conventional design supported at the mantle 3 by columns 4. In operation, the furnace is filled with a mixture of iron ore, coke, and limestone which is charged through hopper 6 to the top of the furnace. Molten iron and slag are tapped from the hearth 7 of the blast furnace in the usual manner. The slag is removed through cinder notch 8 and the molten iron, through iron notch 9. Suitably preheated air or oxygen-enriched air is introduced to the blast furnace through bustle pipe 11 and tuyeres 12. Gas is discharged from the top of the furnace through line 13 for further processing.

Supplemental reducing gas comprising carbon monoxide, hydrogen and acetylene is generated in acetylene generators 14 which are spaced around the periphery of the blast furnace. Details of a suitable acetylene generator are shown in FIG. 3. As illustrated, the acetylene generators are placed in the lower part of the blast furnace stack just above the mantle. The acetylene-containing gas may enter the blast furnace at any appropriate level, preferably at or above the level of introduction of oxygen-containing gas from the tuyeres. The acetylene-containing gas is introduced into that section of the furnace in which the stock or charge of iron ore, coke and limestone is at a temperature above 1800° F. In general, the reducing gas should be introduced in the portion of the furnace above the cinder notch and not higher than the lower one third of stack 18. The reducing gases may be introduced into the bosh 19, i.e. the frusto-conical section above hearth 7 as illustrated, or into the lower part of the stack 18, i.e. the section above mantle 3. The exact location of the acetylene generators will depend to a large extent upon the amount of room available at a given blast furnace installation.

In general, it is preferable to place the burners as near to the level of the introduction of the air blast as possible while still observing precautions to space the burners a sufficient distance from the air blast tuyeres to prevent free oxygen from coming into contact with the gas from the acetylene generators. Since the air blast contacts incandescent coke immediately upon introduction of the air into the furnace, the oxygen contained in the blast is very quickly consumed by reaction with the coke to form carbon monoxide. Therefore, it is usually sufficient to space the acetylene generators a distance of 2 feet or more from the blast tuyeres.

The gases from the acetylene generators are introduced through the wall of the furnace through suitable tuyeres similar to those commonly used for the introduction of the air blast to the furnace.

For the generation of the acetylene-containing reducing gas, air, oxygen-enriched air, or oxygen is supplied by blower or compressor 21 through line 22 to heater 23 where it is preheated prior to introduction to the acetylene generator 14 through line 24. Hydrocarbon, supplied by a suitable pump or compressor 25, is introduced through line 26 into heater 27. Preheated hydrocarbon discharged from heater 27 through line 28 is passed to bustle pipe 29. Preheated oxygen-containing gas is discharged from heater 23 through line 24 to a bustle pipe 30. From bustle pipes 29 and 30, the preheated reactants are supplied to acetylene generators 14. Reactants are passed through lines 31 and 32 from bustle pipes 29 and 30, respectively, to the acetylene generators. A suitable acetylene generator is shown in FIG. 2. The gases are mixed and reacted in the generator and discharged directly into the blast furnace into contact with the stock contained therein.

For high acetylene yields, it is desirable to preheat the oxygen-containing gas to a temperature as high as possible. A satisfactory reducing gas may be generated using relatively pure oxygen supplied to the generator at a temperature of about 600° F. or higher, preferably 650 to 900° F. When air is used, it should be preheated to a temperature above 1500° F. and as high as practical, preferably in the range of 1500 to 2000° F.

Gases leaving the blast furnace through line 13 are passed to a cleaning apparatus consisting of a dust catcher 33 and a washer and dust separator 34 wherein solid particles and some of the water vapor are removed from the gas stream. Gas from the cleaning apparatus is discharged through line 36 to the usual blast furnace stoves, not illustrated, or preheating the oxygen-containing gas supplied to the blast furnace through tuyeres 12 and suitably for partially preheating oxygen-containing gas supplied to heater 28 for the acetylene generators.

Ores of various particle size ranges may be reduced by the process of this invention. Powdered ore or ore of fine particle size may be reduced in a fluid bed reducer. Ore particles too large for fluidization, e.g. larger than one fourth inch in average dimension, may be reduced in fixed bed or settled moving bed reducers, e.g. shaft furnace or blast furnace type operations. In some instances, rotary kilns can be used as reducers, but these are generally less desirable reducers than the bed types because of the difficulty of obtaining uniform and efficient gas-solid contact.

Although the process of this invention is applicable to the reduction of metal oxide and metal sulfide ores which, like iron ores, are capable of direct reduction with reducing gas, the process is particularly advantageous for the reduction of iron ore.

The process of the present invention is applicable to fixed or moving bed direct ore reducers operated at temperatures above the softening temperature of part of the solid material in the reducer but below the melting point or softening temperature of the major portion of the solid particles.

It is often desirable to maintain the temperature of the final reduction zone, in which ferrous oxide is reduced to metallic iron, at a temperature above the softening temperature of the partly reduced ore, for example, at temperatures in the range of 1650 to 2000° F., to obtain rapid reduction of the ore particles to metallic iron. In the reduction of iron ore, a transient phase of low softening temperature solid material occurs when 20 to 50 percent of the iron oxide content of the ore has been reduced to metallic form. A sticky phase occurs with iron oxide at temperatures above about 1600° F. when direct reduction is carried out with mixtures of hydrogen and carbon monoxide. The actual melting points of iron and the iron oxide range from about 2550 to about 2740° F. When the ore is in the form of small particles, for example, smaller than about 1/8 inch in the smallest dimension, is reduced at temperatures above 1600° F., there is a tendency for the particles to stick to one another and to form larger agglomerate masses of relatively weak structure. In many cases the agglomeration of the particles prevents the flow of the particles downwardly in a downwardly moving settled bed reducer, but is of no serious consequence in the operation of fixed bed ore reducers in which the reduction is carried out batch-wise. Agglomeration of the particles may be prevented in the moving bed reducer by admixing reduced product with the ore charge to the reducer. In such cases, it is desirable to admix about six or more parts by weight of reduced product particles with the charge to the final reducer to insure free flow of the particles therethrough when operating at temperatures in the range at which severe agglomeration occurs.

With reference to FIG. 2 of the drawing, a specific embodiment is illustrated wherein direct reduction with acetylene-containing gas is carried out in an ore reducer 50 in which a downwardly moving settled bed of relatively coarse solid particles of ore is maintained. Preferably the ore particles are within the size range of 1/4 inch to 2 inches in average dimension. The reducer is suitably in the form of a vertical cylindrical steel vessel provided with a refractory lining material. Air at appropriate pressure is supplied through a line 51 to a heater 52 where it is heated to a temperature above about 1600° F. and passed through a feed line 53 to a bustle pipe 54 surrounding the reducer. Hydrocarbon gas, suitably natural gas, is introduced from a supply line 56 to a heater 57, where it is suitably preheated, preferably to a temperature above 800° F., and introduced through line 58 to bustle pipe 59 surrounding the lower part of reducer 50.

A series of acetylene generators 55 are spaced peripherally around the lower part of the reducer 50. Details of suitable acetylene generators are disclosed in FIG. 3. Preheated air is supplied to the burners from the bustle pipe 54 through air lines 61 and preheated natural gas is supplied thereto through gas lines 62 leading from bustle pipe 59. The fuel and air react in the generators 55 to produce an acetylene-containing reducing gas comprising carbon monoxide, hydrogen, acetylene and nitrogen, which passes directly into the reducer 50 and upward through the bed of ore contained therein.

It is generally desirable to supply reducing gas to the ore reducer from the acetylene generators 14 at a rate such that the reducing gas passes upwardly through the ore bed at a velocity in the range of 1 to 3 feet per second. The velocity should be insufficient to cause fluidization of the bed of ore particles which move slowly down through the reducer 50. Sufficient heat is liberated by the reaction between the fuel and oxygen-containing gas to maintain the desired temperature level within the bed of ore in the reducer. The temperature of the bed of ore in the reducer 50 is preferably maintained within the range of 1650 to 2000° F.

Reduced product, 85 percent or more of the iron oxide content of which is in the form of metallic iron, is withdrawn from the lower part of the reducer 50 through a product line 66. If desired, part of the product may be returned to the reducer 50 through product recycle line 67.

Part of the off gas or residual gas from the reducer 50 is withdrawn through off gas line 68 and passed to heaters 57 and 57 for use as fuel to preheat the air and natural gas. This gas has a heating value generally of about 120 B.t.u.'s per cubic foot. Generally, about one fourth of the gas from the ore reducer 50 is burned as fuel in heaters 52 and 57; about one third of this is required to preheat the natural gas and two thirds is required to preheat the air.

The remaining residual gas or off gas from reducer 50 is passed to a preheater 70 to preheat and partially reduce the ore before it is introduced into the final reducer 50. Generally about three-fourths of the residual gas from the reducer 50 is utilized in the preheater 70. Gas from reducer 50 passes through line 71 into heater 70. At the same time preheated and partially reduced ore from the preheater 70 passes through line 71 into the final reducer 50. Air, suitably preheated, may be introduced through line 72 into the lower part of preheater 70 effecting partial combustion of the gas entering preheater 70 from reducer 50. Ore is charged to the upper part of the preheater 70, as required, through line 73.

In the preheater 70, the ore is preheated, generally to a temperature of 1600 to 1800° F., and at the same time partially reduced. In the processing of iron ore, for example, the ore may be reduced from the ferric oxide form to ferrous oxide in the preheater 70.

Tail gas from the preheater 70 is discharged through line 74. This gas generally has a heating value above 50 B.t.u.'s per cubic foot and may have a heating value of as much as 100 B.t.u.'s per cubic foot, depending upon the amount of air supplied to the preheater through line 72. Tail gas from the preheater 70 is useful as fuel for the generation steam and for other plant use.

With reference to FIG. 3, an acetylene generator suitable for use in the process is shown in cross-section. The acetylene generator comprises a cylindrical steel shell 75 provided internally with refractory lining material 76 which acts as thermal insulation for the metal shell and defines a cylindrical reaction zone 77. Flange 78 is provided for attaching the acetylene generator to the wall of the ore reducer. At the opposite end of the cylindrical steel housing 75, a flanged nozzle 79 is provided to accommodate a mixer-burner 80.

The burner 80 comprises an outer tubular conduit 81, preferably of stainless steel, and provided with a constricted tip 82. A second conduit 83 is contained within the outer conduit 81 and uniformly spaced therefrom by guides 84 to provide an annular passageway 86 between the two conduits. The inner conduit 83 is provided at its tip 87 with a constricted outlet port 88. Suitably the area of the outlet port 88 is one half to one fourth the area of conduit 83. The tip portion 87 of the inner conduit 83 is also tapered externally to provide a substantially uniform annular passageway for gas supplied through the annulus 86. Air is supplied to central conduit 83 of the burner through line 91 while gas is supplied to the annular space 86 between the inner and outer conduits through line 92.

The burner is arranged to discharge air and gas at high velocity into one end of the cylindrical acetylene generator reaction chamber 77. Gas and air are admixed with one another at the burner tip by bringing the annular stream of gas into contact with the central stream of air at high velocities. The burner conduits 81 and 83 are aligned axially of the acetylene generation reaction chamber 77 for fast, uniform flow through the reaction zone. Acetylene-containing gas is discharged from the opposite end of reaction chamber 77 directly into the ore reducer.

EXAMPLE 1

Natural gas is used to produce an acetylene-containing reducing gas. The natural gas has the following composition, expressed in volume percent:

*Natural gas composition*

| | |
|---|---|
| Methane | 86.2 |
| Ethane | 5.0 |
| Propane | 3.0 |
| Butanes | 0.7 |
| $C_5$ hydrocarbons | 0.8 |
| Nitrogen | 2.6 |
| Carbon dioxide | 0.9 |
| Oxygen | 0.8 |

The natural gas is preheated to 840° F. in a tubular preheater and supplied at the rate of 2,919 s.c.f.h. (standard cubic feet per hour at 60° F. and atmospheric pressure) to an acetylene generator as illustrated in FIG. 3. Air is supplied at the rate of 9,998 s.c.f.h., preheated to 1,730° F. in a series of two tubular heaters, one containing carbon steel tubes in which the air is preheated to about 500° F. and the other, a stainless steel coil in which the air is preheated to the final temperature. The preheated air and gas are mixed and reacted in a reducing gas generator, comprising a cylindrical reaction chamber 4 inches in diameter by 18 inches long, at 11.5 p.s.i.g. and an autogenous temperature of 2,125° F. to produce reducing gas having the following composition, expressed in volume percent:

*Reducing gas composition*

| | |
|---|---|
| Carbon monoxide | 11.7 |
| Hydrogen | 18.3 |
| Acetylene | 2.4 |
| Carbon dioxide | 2.0 |
| Nitrogen | 50.1 |
| Methane | 2.5 |
| Ethylene | 0.1 |
| Ethane | 0.3 |
| Argon | 0.6 |
| Water | 12.0 |

This acetylene-containing reducing gas, at the rate of 15,850 s.c.f.h., is discharged at a pressure of 11.5 p.s.i.g. and 2,125° F. directly to an ore reducer. The reducing gas generator may be bolted to the wall of the ore reducer to discharge the gas through an tuyere or insulated aperture directly into the ore in the reducer. The residence time in the gas generator is calculated as 0.011 second, based on the volume of the product gas leaving the reducing gas generator. In this specific example, the yield of acetylene, based on the carbon in the feed, is more than 20%.

In a two-stage reducer, as illustrated in FIG. 2, 657 pounds per hour of iron ore containing 69.9 weight percent Fe can be reduced to a sponge iron product in which the iron oxide has been 85% reduced to metal by the reducing gas of this example to produce 488 pounds per hour of sponge iron product. The sponge iron would be discharged from the reducer at a temperature of about 1880° F. Part of the off gas leaving the top of the reducer at 1500° F. is available for use as fuel and the remainder is supplied to the ore preheater. As a specific example, 8,742 s.c.f.h. of off gas is withdrawn as fuel gas and the remainder, an equal quantity, passed to the ore preheater together with 525 s.c.h.f. of air preheated to 1730° F. The air supplied to the ore preheater with the gas off effects partial combustion of the off gas to supply heat and reducing gas for the preheater. The off gas withdrawn for use as fuel has a higher heating value (dry basis) of about 136 B.t.u.'s per cubic foot. Tail gas, discharged from the preheater at the rate of 10,223 s.c.f.h., would have a heating value (dry basis) of about 77 B.t.u.'s per cubic foot.

About 14,074 of natural gas would be required per ton of metallic iron in the product.

EXAMPLE 2

Reducing gas is produced by reacting natural gas at the rate of 445 s.c.f.h. (30″ of mercury and 60° F.) preheated to 1200° F. with air at the rate of 1,280 s.c.f.h., preheated to 1750° F. The air and natural gas are subjected to non-catalytic reactions in a flow-type synthesis gas generator maintained at a pressure of 15 p.s.i.g. at an autogenous temperature at 2200° F. The gas generator comprises a refractory lined unpacked reaction zone, 24 inches in diameter by 48 inches long, with a volume of about 12.5 cubic feet. The residence time in the reactor is about 20 seconds to insure a high ratio of

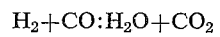

$$H_2 + CO : H_2O + CO_2$$

The natural gas has the following approximate composition expressed in mol percent:

*Natural gas composition*

| | |
|---|---|
| Methane | 92.0 |
| Ethane | 2.0 |
| Higher hydrocarbons | 1.0 |
| Carbon dioxide | 1.0 |
| Nitrogen | 4.0 |

Reducing gas of the following composition, expressed in mol percent, is produced at the rate of 2,275 standard cubic feet per hour:

*Reducing gas composition*

| | |
|---|---|
| Hydrogen | 30.1 |
| Carbon monoxide | 16.7 |
| Water vapor | 5.4 |
| Carbon dioxide | 1.1 |
| Nitrogen and argon | 45.7 |
| Methane | 1.0 |

In an ore reduction system, as illustrated in FIG. 2, the gas of the example is capable of reducing 83.5 pounds per hour of iron ore containing 69.9 weight percent Fe (as in Example 1) to produce 61.9 pounds per hour of an 85 percent metallized product discharged from the reducer at about 1880° F. Half of the off gas from the reducer, or 1,156 s.c.f.h., may be withdrawn as fuel. This gas has a higher heating value (dry basis) of about 136 B.t.u.'s and a temperature of 1500° F. The remainder of the off gas is supplied with 69.5 s.c.f.h. of air preheated to 1750° F. to the preheater of FIG. 2. Tail gas from the preheater, having a higher heating value (dry basis) of 69.5 B.t.u.'s per cubic foot, is discharged at the rate of 1,238 s.c.f.h.

About 16,915 s.c.f.h. of natural gas is required per ton of Fe produced with the reducing gas of this example.

In the above examples, the average ore reducing temperature is assumed as 2060° F. At a lower reduction temperature, e.g., 1700° F., there is less advantage for the reducing gas containing acetylene. With a mean ore reduction temperature of 1700° F., a comparison between the reducing gases of Examples 1 and 2, above, shows that the amount of natural gas required to generate the reducing gas required to produce one ton of Fe in the product would be about 16,900 s.c.f.h. for Example 1 and about 18,400 s.c.f.h. for Example 2. It is advantageous, therefore, to utilize the acetylene-containing reducing gas at high temperature, preferably at a temperature of 2000° F. or higher. The acetylene-containing reducing gas is preferably supplied directly from the gas generator to the ore reducing zone without any cooling, purification or other treatment. In some instances, it may be desirable to cool the reducing gas, remove water from the gas and reheat the dried gas to the temperature required for ore reduction, e.g., 1500 to 2500° F., by heat exchange or by partial combustion. When applied to a blast furnace to supply auxiliary reducing gas to the blast furnace, the acetylene generators are preferably positioned on the stack of the furnace to discharge gases directly into the furnace at a point where the temperature of the stock is above about 2000° F.

I claim:
1. In the reduction of metal oxides in a blast furnace wherein reducing gas consisting essentially of carbon monoxide and hydrogen is injected into the blast furnace, the improvement which comprises supplying reducing gas containing 1 to 4 mol percent acetylene into the stack of the blast furnace at a point along the stack where the temperature of the stock is at least 2000° F.

2. A process for the reduction of iron oxide to molten metallic iron wherein iron oxide admixed with coke and a fluxing material is contacted in an elongated vertical reduction zone with an upwardly flowing stream of reducing gas comprising carbon monoxide whereby the iron oxide is reduced to molten iron and an oxygen-containing gas is introduced into the lower portion of said reduction zone whereby coke is converted to carbon monoxide, the improvement which comprises generating an auxiliary stream of reducing gas comprising carbon monoxide and hydrogen and containing 1 to 4 percent acetylene, and 0 to 12 percent water vapor, and 0 to 4 percent carbon dioxide by volume by reaction of a hydrocarbon with oxygen-containing gas for a period of time within the range of 0.005 to 0.05 second in a separate compact and unpacked gas generation zone at an autogenous temperature above 2000° F., and introducing said auxiliary stream of reducing gas substantially at said reaction temperature immediately and directly into said reduction zone.

3. In the reduction of metal oxides in a blast furnace, the improvement which comprises reacting preheated gaseous hydrocarbon with oxygen-containing gas in an unpacked compact reaction zone at an autogenously maintained temperature in the range of 2100 to 2200° F. for a period of time within the range of about 0.005 to 0.05 second forming reducing gas consisting essentially of carbon monoxide, hydrogen and acetylene and containing 1 to 4 mol percent acetylene, and supplying said reducing gas directly from said reaction zone to a blast furnace at a point where the temperature of the stock is at least 2000° F.

4. A process according to claim 3 wherein said hydrocarbon is natural gas preheated to a temperature above about 600° F. and said oxygen-containing gas is air preheated to at least 1500° F.

5. In the reduction of metal oxides in a blast furnace wherein reducing gas consisting essentially of carbon monoxide and hydrogen is injected into the blast furnace, the improvement which comprises supplying reducing gas containing 1 to 4 mol percent acetylene to a point within the lower portion of the blast furnace and at a distance of at least 3 feet from the point of introduction of blast air to the blast furnace to prevent direct reaction of oxygen-containing gas with acetylene-containing reducing gas within said blast furnace.

References Cited by the Examiner

UNITED STATES PATENTS

| | | | |
|---|---|---|---|
| 2,125,909 | 8/38 | Gahl | 75—34 |
| 2,727,816 | 12/55 | Raick | 75—42 |
| 2,790,711 | 4/57 | Sellers | 75—42 |
| 2,952,533 | 9/60 | Cuscoleca | 75—42 |

DAVID L. RECK, *Primary Examiner.*

WINSTON A. DOUGLAS, *Examiner.*